March 11, 1958  K. D. HAMMACK  2,826,089
HAND CONTROLS FOR AUTOMOBILES
Filed Aug. 27, 1956
FIG. 1.
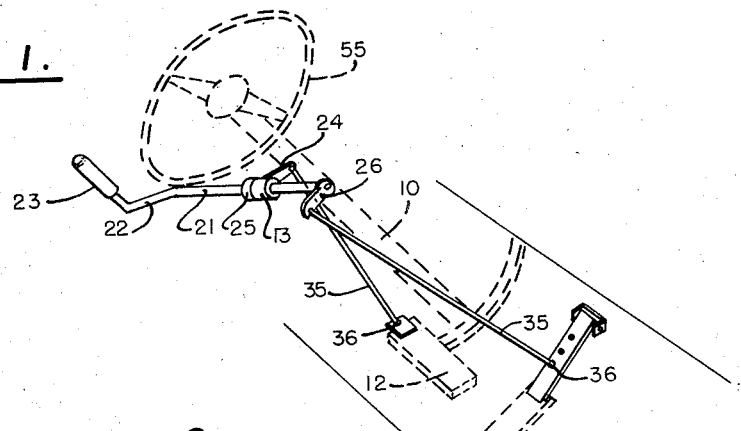
FIG. 2.
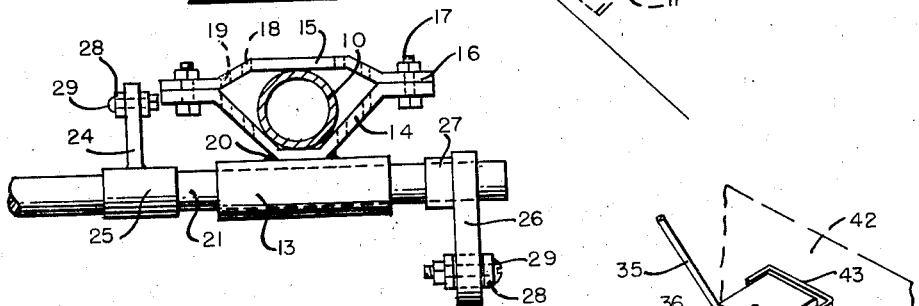
FIG. 3.
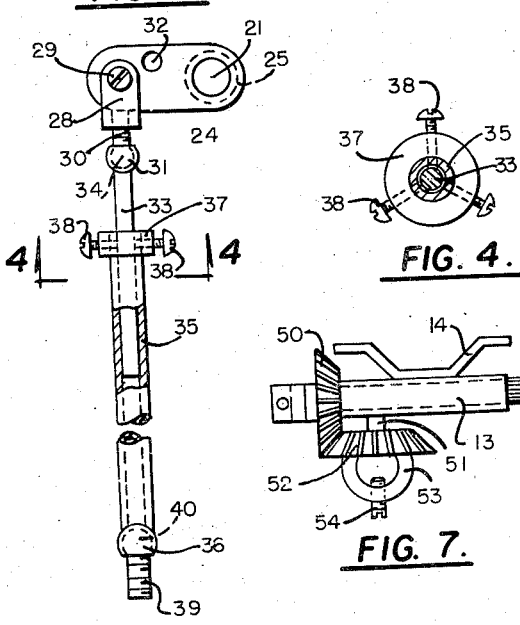
FIG. 4.
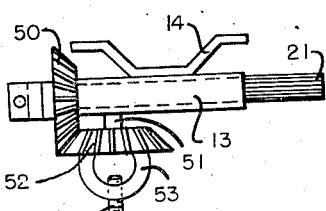
FIG. 5.
FIG. 6.
FIG. 7.
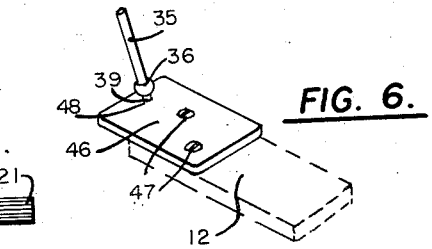
INVENTOR.
Kenneth D. Hammack United States Patent Office 2,826,089
Patented Mar. 11, 1958

2,826,089
HAND CONTROLS FOR AUTOMOBILES
Kenneth D. Hammack, Missouri Valley, Iowa
Application August 27, 1956, Serial No. 606,246
2 Claims. (Cl. 74—484)

This invention relates to hand controls for automobiles.
It is an object of the present invention to provide hand controls for automobiles which will permit anyone without legs or the use thereof to operate a vehicle with the use of only the hands.

It is another object of the present invention to provide a hand control for automobiles of the above type which leaves undisturbed the original controls of the vehicle and permits the motorist to alternate from foot to hand control and back for relief of tiredness or for city driving.

Other objects of the invention are to provide a hand control for automobiles bearing the above objects in mind which is of simple construction, has a minimum number of parts, is inexpensive to manufacture and efficient in use.

For other objects and for a better understanding of the invention, reference may be had to the following detailed description taken in connection with the accompanying drawing, in which:

Figure 1 is a perspective view of a preferred embodiment of the present invention shown in operative use;

Fig. 2 is a fragmentary top plan view thereof on an enlarged scale;

Fig. 3 is an end elevational view thereof;

Fig. 4 is a transverse sectional view taken along the line 4—4 of Fig. 3;

Fig. 5 is a perspective view of one of the parts of the invention connected to the gas pedal;

Fig. 6 is a perspective view of another of the parts of the invention connected to the brake pedal; and Fig. 7 is a front elevational view of a modified form of the present invention.

Referring now more in detail to the drawing, and more particularly to Figs. 1 through 6, 10 represents the steering post, the gas pedal 11 and 12 the brake pedal forming the controls of a motor vehicle, substantially as illustrated.

In the practice of my invention, a hollow cylindrical bearing member 13 is mounted on the steering post 10, transversely thereof, on the side adjacent the driver, by means of the trapezoidal shaped clamps 14 and 15 which come together on opposite sides of the steering post and are secured together by means of the flanges 16 and the nut and bolt assemblies 17. The clamps 14 and 15 are provided with the spaced openings 18 and 19 therethrough adapted to receive U-bolts of varying size and adapting the clamps to steering posts of varying diameter. The bearing member 13 is secured to the central portion of the clamp 14 by means of welding 20 and the like.

A shaft 21 is rotatably mounted within the bearing member 13 and is formed at one end with the laterally bent portion 22 which is in turn connected to the handle 23 whereby to facilitate the rotational movement of shaft 21 within the bearing member 13 (Fig. 1).

On one side of the steering post, a lever 24 is fixedly mounted on the shaft 21 by means of the hub portion or sleeve 25 while a second lever 26 is fixedly mounted on the shaft 21 on the other side of the steering post by means of the hub portion 27, the lever 26 extending in the opposite direction from the lever 24.

The bifurcated members 28 are pivotally mounted on the ends of the levers 24 and 26 by means of the nut and bolt assemblies 29, the lower central portion of the bifurcated members 28 being internally threaded and receiving upwardly therewithin the externally threaded stud 30 formed at its lower end with the ball socket 31. The levers 24 and 26 are provided with a plurality of openings 32 for adjustment purposes and receiving selectively therethrough the nut and bolt assemblies 29, as will be obvious. Further adjustment is provided by means of the externally threaded studs 30 within the internally threaded openings in the lower ends of the bifurcated members 28. A pair of elongated rods 33 are provided at their upper ends with the balls 34 which are mounted within the sockets 31, the lower ends of the rods 33 being telescopically received within the hollow tubes 35 formed at their lower ends with the ball sockets 36.

A collar 37 adapted to abut the upper end of the tubes 35 is fixedly secured to the rods 33 near their upper ends by means of the set screws 38. Thus, when either of the rods 33 moves downwardly, the collars 37 thereof will force the tubes 37 downwardly. However, when the rods 33 move upwardly, they will move upwardly relative to the tubes 35.

An externally threaded stud 39 is formed at its upper end with a ball 40 which is rotatably mounted within each of the sockets 36.

A plate 41 is pivotally mounted on the far wall 42 of the vehicle by means of the U-shaped bracket 43 suitably secured thereto, the pin 44 and the depending lugs fixedly carried by the plate 41 at the forward end thereof (not shown) (Fig. 5). The free end of the plate 41 extends rearwardly above the gas pedal 11 and is provided with the longitudinally spaced internally threaded openings 45 which selectively receive therewithin one of the studs 39 connected to one of the tubes 35 as described.

A second plate 46 is fixedly secured to the top of the brake pedal 12 at one side by means of the fastening means 47 (Fig. 6) and is provided with an internally threaded opening 48 which receives therewithin the other of the studs 39 mounted within the lower end of the other tube 35.

In operation, upon rotation of the shaft 21 in a clockwise direction, the lever 24 will move downwardly to force downwardly therewith the rod 33 and by means of the collar 37 the tube 35 to depress the brake pedal 12. During this operation the lever 26 will be raised, carrying with it the other rod 33 and collar 37. However, this raising movement will permit the gas pedal 11 to float under the action of its own spring and will not force the pedal upwardly beyond its limit. Conversely, when the shaft 21 is rotated in a counter-clockwise direction, the lever 26 will be lowered carrying with it the rod 33 and the collar 37 and forcing downwardly the tube 35 which engages the gas pedal 11. Simultaneously, the lever 24 will be raised to carry with it the rod 33 in the other tube 35. However, the tube 35 connected to the brake pedal will again be permitted to attain its normal position due to the telescopic movement of the rod 33 upwardly therewithin.

Referring now particularly to Fig. 7, there is shown a modified form of the present invention wherein the shaft 21 is rotated within the bearing member 13 by means of a bevel gear 50 secured to one end thereof. A shaft 51 is journalled on the undersurface of the bearing member 13 and fixedly mounts the bevel gear 52 in mesh with the bevel gear 50. A loop 53 is secured to the undersurface of the bevel gear 52 and is in turn engaged by a handle member 54 which extends rearwardly within the steering wheel 55. Upon rotation of this handle about the axis of the shaft 51, the same motion will be effected of the gas pedal and brake pedal as described in connection with the first form of the invention.

In other respects the form of the invention shown in Fig. 7 is the same as that shown in Figs. 1 through 6, and like reference numerals identify like parts throughout the several views.

While various changes may be made in the detail construction, it shall be understood that such changes shall be within the spirit and scope of the present invention as defined by the appended claims.

What I claim as new and desire to protect by Letters Patent of the United States is:

1. A hand control for vehicles having a steering post, mounted steering wheel, a gas pedal and a brake pedal, set control comprising a transverse bearing member, means for mounting said transverse bearing member on the steering post below the steering wheel, a shaft rotatably mounted within said bearing member, means for rotating said shaft, a pair of oppositely extending levers fixedly mounted on said shaft on opposite sides of the steering post, a first plate pivotally mounted above the gas pedal with the free ends thereof overlying the gas pedal, a second plate mounted on the brake pedal, and linkage means connecting said first and second plates with said oppositely extending levers, whereby to alternately depress the gas pedal and brake pedal upon rotation of the shaft in opposite directions, said linkage means comprising a bifurcated member pivotally mounted on the outer end of each of said levers, each of said bifurcated members at its central lower portion being internally threaded, an externally threaded stud adjustably positioned within said internally threaded openings in said bifurcated members and depending therefrom, each of said studs being formed at its lower end with a ball socket, and an elongated rod integrally formed at its upper end with a ball rotatably mounted within each of said ball sockets, an elongated hollow tube telescopically receiving therewithin the lower end of each of said rods, a collar secured to the upper ends of each of said rods adapted to abut the upper ends of said tubes whereby to move the same downwardly upon downward motion of said rods but to permit said rods to move upwardly free of said tubes, and means connecting the lower ends of said tubes to said plates.

2. A hand control according to claim 1, said means for connecting the lower ends of said tubes to said plates comprising each of said tubes at the lower ends being formed with a ball socket, and an externally threaded stud having a ball formation at the upper end rotatably mounted within each of said ball sockets at the lower ends of said tubes, said first and second plates being provided with internally threaded openings longitudinally spaced apart to selectively receive said studs therewithin.

References Cited in the file of this patent

UNITED STATES PATENTS

| | | |
|---|---|---|
| 1,906,366 | Burns | May 2, 1933 |
| 2,537,222 | Horne | Jan. 9, 1951 |
| 2,602,348 | Wilson | July 8, 1952 |
| 2,658,409 | Hughes | Nov. 10, 1953 |
| 2,724,285 | Lerman | Nov. 22, 1955 |